(12) United States Patent
Mitsuda et al.

(10) Patent No.: US 12,019,986 B2
(45) Date of Patent: Jun. 25, 2024

(54) UTTERANCE PAIR ACQUISITION APPARATUS, UTTERANCE PAIR ACQUISITION METHOD, AND PROGRAM

(71) Applicant: NIPPON TELEGRAPH AND TELEPHONE CORPORATION, Tokyo (JP)

(72) Inventors: Ko Mitsuda, Tokyo (JP); Ryuichiro Higashinaka, Tokyo (JP); Taichi Katayama, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 311 days.

(21) Appl. No.: 17/603,451

(22) PCT Filed: Apr. 10, 2020

(86) PCT No.: PCT/JP2020/016149
§ 371 (c)(1),
(2) Date: Oct. 13, 2021

(87) PCT Pub. No.: WO2020/213531
PCT Pub. Date: Oct. 22, 2020

(65) Prior Publication Data
US 2022/0207239 A1   Jun. 30, 2022

(30) Foreign Application Priority Data
Apr. 16, 2019 (JP) ................. 2019-078137

(51) Int. Cl.
*G06F 40/279* (2020.01)
*G06F 16/632* (2019.01)
(Continued)

(52) U.S. Cl.
CPC .......... *G06F 40/279* (2020.01); *G06F 16/632* (2019.01); *G06F 16/686* (2019.01); *G06F 40/35* (2020.01)

(58) Field of Classification Search
None
See application file for complete search history.

(56) References Cited

U.S. PATENT DOCUMENTS 9,064,006 B2 * 6/2015 Hakkani-Tur ...... G06F 16/3332
2011/0145333 A1 * 6/2011 Hind ................... G06Q 30/02
715/201

(Continued)

OTHER PUBLICATIONS

Vinyals et al. (2015) "A Neural Conversational Model," ICML, Jul. 6, 2015.

*Primary Examiner* — Jesse S Pullias

(57) ABSTRACT

Acquisition of an utterance pair for expanding a set of utterance pairs for outputting an output utterance in response to receiving a given utterance is described. A keyword extraction unit is configured to compare a degree of characteristic of a word in expansion source utterance pair data and a degree of characteristics of a word in the given utterance data. The expansion source utterance pair data represents a set of expansion source utterance pairs including an input utterance and an output utterance for the input utterance. The present technology includes extracting, based on a comparison result, a keyword list including a keyword that is characteristic of the expansion source utterance pair data. An utterance pair extraction unit is configured to extract, based on the keyword list, an utterance pair from a set of given utterance pairs as an addition for expanding the set of utterance pairs.

12 Claims, 8 Drawing Sheets

```
RAW VEGETABLES                    BOIL IT DELICIOUSLY

SPINACH IS RICH IN ZINC           IT IS ALSO RICH IN VITAMINS

INSTAGRAM IS ALSO INTERESTING     INSTAGRAM LOOKS INTERESTING

• • •
```

(51) Int. Cl.
*G06F 16/68* (2019.01)
*G06F 40/35* (2020.01)

(56) References Cited

U.S. PATENT DOCUMENTS

| | | | | |
|---|---|---|---|---|
| 2018/0357221 A1* | 12/2018 | Galitsky | ............... | G06F 40/289 |
| 2019/0065576 A1* | 2/2019 | Peng | .................... | G06F 16/285 |
| 2019/0237061 A1* | 8/2019 | Rusak | ................... | G06F 40/216 |
| 2020/0042597 A1* | 2/2020 | Wu | ........................ | H04L 51/02 |
| 2020/0097544 A1* | 3/2020 | Alexander | ............. | G06F 40/35 |

* cited by examiner

| | |
|---|---|
| I WANT TO EAT SUSHI | I CAN EAT ENDLESSLY |
| I WANT TO EAT RAMEN | MISO IS GOOD |
| I AM WORRIED ABOUT WHETHER LOCAL HIGH SCHOOL WINS OR LOSES IN HIGH SCHOOL BASEBALL TOURNAMENT | I WANT THEM TO PLAY WELL |
| WHICH BASEBALL TEAM DO YOU LIKE IN JAPANESE PROFESSIONAL BASEBALL | I LIKE GIANTS |
| I'M MAKING SOBA NOODLES RIGHT NOW | I HAVE DONE IT BEFORE |
| BEER IS TASTY | BECAUSE IT'S NOT LOW-MALT BEER |
| AFTER ALL, SALT AND PEPPER GO WELL YAKINIKU | THEY BRING OUT FLAVOR OF INGREDIENTS |
| TO PLAY MAHJONG, YOU USE YOUR BRAIN | IT'S ALSO GOOD FOR HAND EXERCISE. |
| CAKE IS DELICIOUS | FRESH CREAM IS DELICIOUS |
| CHOCOLATE IS GOOD FOR HEALTH | IT IS SAID TO BE EFFECTIVE FOR DIETING |
| . . . | |

Fig. 3

```
WHAT IS YOUR HOBBY?
LET ME SEE,
I OFTEN LISTEN TO MUSIC.
WHAT GENRE DO YOU LIKE?
I LIKE CLASSICAL MUSIC.
FOR CLASSICAL MUSIC, I LISTEN TO VARIOUS THINGS SUCH AS PIANO AND OPERA.
I LOVE TOO.
ESPECIALLY BECAUSE I'VE BEEN PLAYING PIANO FOR LONG TIME.
IS THAT SO.
I HAVE BEEN PLAYING PIANO SINCE I WAS LITTLE, TOO.
DO YOU HAVE FAVORITE PIANIST?
I LIKE PASSIONATE PIANISTS, SUCH AS BEETHOVEN.
RECENTLY I'VE BEEN PRACTICING PIECES OF SHOSTAKOVICH
. . .
```

Fig. 4

| | |
|---|---|
| FEEL | 1.6662e-186 |
| GOOD | 3.0276e-177 |
| DAILY | 1.5177e-175 |
| ESPECIALLY | 1.5310e-166 |
| HIGHEST | 1.4406e-143 |
| CONVERSION | 2.3102e-143 |
| INTERESTING | 8.7637e-133 |
| ... | |

Fig. 5

| | |
|---|---|
| IS THIS FIRST TIME THIS YEAR | YOU MET |
| DID YOU CALL ME | I DON'T KNOW |
| ROLL CAKE IS CUTE BUT HOW TO USE | EXACTLY |
| GOOD MORNING | GOOD MORNING |
| PLEASE CALL ME HOGE | PLEASE CALL ME FUGA |
| I MESSED UP FIRST THING IN NEW YEAR | WHAT IS IT?? |
| IT'S MY FIRST VISIT TO SHIN-OKUBO | IT'S GOOD PLACE |

Fig. 6

| | |
|---|---|
| RAW VEGETABLES | BOIL IT DELICIOUSLY |
| SPINACH IS RICH IN ZINC | IT IS ALSO RICH IN VITAMINS |
| INSTAGRAM IS ALSO INTERESTING | INSTAGRAM LOOKS INTERESTING |
| . . . | |

Fig. 7

UTTERANCE PAIR ACQUISITION APPARATUS, UTTERANCE PAIR ACQUISITION METHOD, AND PROGRAM

CROSS-REFERENCE TO RELATED APPLICATIONS

This application is a U.S. 371 Application of International Patent Application No. PCT/JP2020/016149, filed on 10 Apr. 2020, which application claims priority to and the benefit of JP Application No. 2019-078137, filed on 16 Apr. 2019, the disclosures of which are hereby incorporated herein by reference in their entireties.

TECHNICAL FIELD

The present disclosure relates to an utterance pair acquisition device, an utterance pair acquisition method, and a program.

BACKGROUND ART

Through a dialogue system, a person interacts with a computer to obtain various pieces of information and satisfy demands. Further, there is also a dialogue system that does not only achieve a predetermined task, but also performs daily conversation. Such dialogue systems allow a person to obtain mental stability, satisfies desire for recognition, and build trust. Types of the dialogue system are described in Reference 1.

[Reference 1] Kawahara Tatsuya, A Brief History of Spoken Dialogue Systems: Evolution and Recent Technical Trend, Journal of Japanese Society for Artificial Intelligence, Vol. 28, No. 1, p. 45-51, 2013

In recent years, in dialogue systems, an utterance generation model using deep learning has been noted as a method to output the output utterance of a system for input utterance of the user. This method is a method of preparing training data in which input utterances and output utterances are paired, and training a model that generates an utterance based on the training data. The utterance generation model captures an input utterance and an output utterance as vectors, and learns the correspondence relationship of the vectors. Utilizing the utterance generation model allows understanding of a meaning and content, rather than the text string, of an utterance, and the quality of the output utterance is improved. Details of the utterance generation model are described in Non Patent Literature 1.

In training of the utterance generation model, the quality of the utterance pair that is training data directly affects the performance of the generation model. Accordingly, it is desirable to obtain a large amount of high-quality training data. For example, in a case of training an utterance generation device that generates a question for an optional input utterance or an utterance generation device that generates an utterance that supports the content of an optional input utterance, it is common to prepare training data by manually describing a pair of an input utterance and an output utterance.

CITATION LIST

Non Patent Literature

Non Patent Literature 1: Vinyals, O., Le, Q.: A neural conversational model. In: Proc. ICML Deep Learning Workshop (2015)

SUMMARY OF THE INVENTION

Technical Problem

In order to train the utterance generation model, a large amount of high-quality training data is required. However, an amount of data that can be manually created is limited. Therefore, with only the training data collected manually, input utterances having a wide variety cannot be handled, and there is a case where the utterance generation model cannot be trained so as to output an output utterance suitable for an input utterance.

The present disclosure has been made in view of the above circumstances, and an object of the present disclosure is to provide an utterance pair acquisition device, an utterance pair acquisition method, and a program capable of acquiring an utterance pair for expansion necessary for outputting an appropriate output utterance for an input utterance.

Means for Solving the Problem

To achieve the above object, an utterance pair acquisition device according to a first aspect is configured by including a keyword extraction unit configured to compare a degree of characteristic of a word included in expansion source utterance pair data that is a set of expansion source utterance pairs including an input utterance and an output utterance for the input utterance and a degree of characteristic of a word included in utterance data for comparison that is a set of utterances to extract, based on a comparison result, a keyword list including a keyword that is characteristic of the expansion source utterance pair, an utterance pair extraction unit configured to extract, based on the keyword list that is extracted and utterance pair data for extraction including a set of utterance pairs for extraction that are a set of optional utterance pairs, an utterance pair for extraction that satisfies a predetermined condition regarding the keyword list from among the utterance pairs for extraction as an utterance pair for expansion, and an utterance pair extraction unit.

Further, in the utterance pair acquisition device according to the first aspect, the keyword extraction unit may compare a degree of characteristic of a word included in the input utterance of the expansion source utterance pair data and a degree of characteristic of a word included in the utterance data for comparison to extract a keyword list for the input utterance, and compare a degree of characteristic of a word included in the output utterance and a degree of characteristic of a word included in the utterance data for comparison to extract a keyword list for the output utterance, and the utterance pair extraction unit may extract, in a case where the input utterance included in the utterance pair for extraction satisfies a predetermined condition regarding the keyword list for the input utterance, and an output utterance for the input utterance satisfies a predetermined condition regarding the keyword list for the output utterance, the utterance pair for extraction as the utterance pair for expansion.

Further, in the utterance pair acquisition device according to the first aspect, the predetermined condition may be a ratio of a word included in the utterance pair for extraction that matches a keyword in the keyword list and may be a ratio that is optionally settable.

An utterance pair acquisition method according to a second aspect is executed by including comparing a degree of characteristic of a word included in expansion source utterance pair data that is a set of expansion source utterance pairs including an input utterance and an output utterance for the input utterance and a degree of characteristic of a word included in utterance data for comparison that is a set of utterances to extract, based on a comparison result, a keyword list including a keyword that is characteristic of the expansion source utterance pair, and extracting, based on the keyword list that is extracted and utterance pair data for extraction including a set of utterance pairs for extraction that are a set of optional utterance pairs, an utterance pair for extraction that satisfies a predetermined condition regarding the keyword list from among the utterance pairs for extraction as an utterance pair for expansion.

A program according to a third aspect is a program that causes a computer to execute comparing a degree of characteristic of a word included in expansion source utterance pair data that is a set of expansion source utterance pairs including an input utterance and an output utterance for the input utterance and a degree of characteristic of a word included in utterance data for comparison that is a set of utterances to extract, based on a comparison result, a keyword list including a keyword that is characteristic of the expansion source utterance pair, and extracting, based on the keyword list that is extracted and utterance pair data for extraction including a set of utterance pairs for extraction that are a set of optional utterance pairs, an utterance pair for extraction that satisfies a predetermined condition regarding the keyword list from among the utterance pairs for extraction as an utterance pair for expansion.

Effects of the Invention

According to the utterance pair acquisition device, the utterance pair acquisition method, and the program of the present disclosure, the effect that an utterance pair for expansion necessary for outputting an appropriate output utterance for an input utterance can be acquired can be obtained.

BRIEF DESCRIPTION OF DRAWINGS

FIG. 3 is a diagram illustrating an example of support utterance pair data as an example of expansion source utterance pair data.

FIG. 4 is a diagram illustrating an example of utterance data for comparison.

FIG. 5 is a diagram illustrating an example of a word and a p-value of the word obtained to be a result of performing a test for each word.

FIG. 6 is a diagram illustrating an example of a reply pair set of Twitter (trade name) as an example of utterance pair data for extraction.

FIG. 7 is a diagram illustrating an example of utterance pair data for expansion including an utterance pair for expansion output by an utterance pair extraction unit.

DESCRIPTION OF EMBODIMENTS

Hereinafter, embodiments of the present disclosure will be described in detail with reference to the drawings.

The embodiments of the present disclosure use a method of increasing an amount of training data that can be used for training by acquiring, based on training data (a pair of an input utterance and an output utterance) collected manually, data similar to the training data from a large amount of text data.

Figure 1:
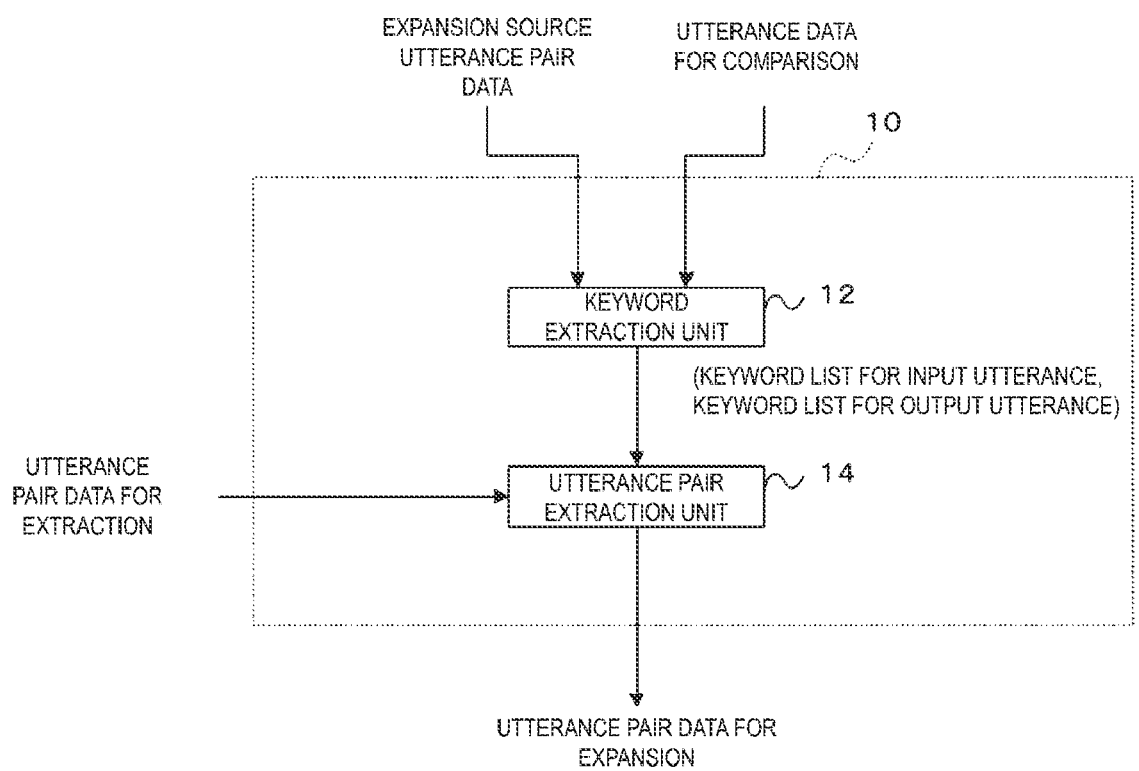
FIG. 1 is a block diagram illustrating a configuration of an utterance pair acquisition device according to an embodiment of the present disclosure.

Configuration of Utterance Pair Acquisition Device According to Embodiments of Present Disclosure FIG. 1 is a block diagram illustrating an example of a system configuration of an utterance pair acquisition device 10 of an embodiment of the present disclosure. The utterance pair acquisition device 10 illustrated having the configuration in FIG. 1 can be composed of a computer including a central processing unit (CPU), a random access memory (RAM), a program for executing each processing routine described below, and a read only memory (ROM) storing various types of data.

Figure 2:
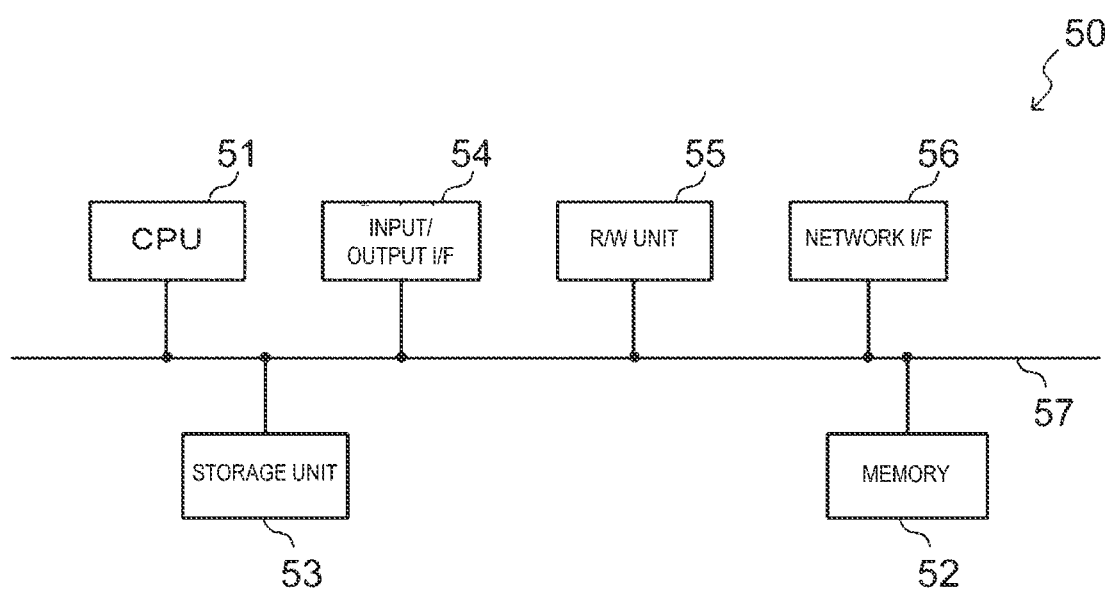
FIG. 2 is a schematic block diagram illustrating an example of a computer functioning as the utterance pair acquisition device.

FIG. 2 is a schematic block diagram illustrating an example of a computer serving as the utterance pair acquisition device 10. For example, the utterance pair acquisition device 10 can be implemented by a computer 50 illustrated in FIG. 2. The computer 50 includes a CPU 51, a memory 52 as a temporary storage area, and a non-volatile storage unit 53. Further, the computer 50 includes an input/output interface (I/F) 54 to which an input/output device (not illustrated) or the like is connected, and a read/write (R/W) unit 55 that controls reading and writing of data from and to a recording medium. Further, the computer 50 includes a network I/F 56 connected to a network, such as the Internet. The CPU 51, the memory 52, the storage unit 53, the input/output I/F 54, the R/W unit 55, and the network I/F 56 are connected to each other via a bus 57.

The storage unit 53 can be implemented by a hard disk drive (HDD), a solid state drive (SSD), a flash memory, or the like. A program for causing the computer 50 to function is stored in the storage unit 53 as a storage medium. The CPU 51 reads the program from the storage unit 53 and loads the program into the memory 52, and sequentially executes processes that the program has.

Described above is an example of the electrical configuration of the computer in FIG. 2.

Hereinafter, the utterance pair acquisition device 10 of FIG. 1 will be described. As illustrated in FIG. 1, the utterance pair acquisition device 10 includes a keyword extraction unit 12 and an utterance pair extraction unit 14.

The utterance pair acquisition device 10 according to the embodiment of the present disclosure will be described by an example of a case in which the dialogue system is a support utterance generation system. In the embodiment of the present disclosure, utterance pair data for expansion is acquired by using support utterance pair data including a support utterance pair as expansion source utterance pair data. The support utterance pair data is a pair set in which an utterance that expresses a positive (or negative) opinion on a particular topic and a specific reason for the utterance are paired as an input utterance and an output utterance. The pair of an input utterance and an output utterance of the support utterance pair data is, for example, a pair of the output utterance "the sea is beautiful" for the input utterance "Yokohama is good".

Note that the subject of application of the present method is not limited to an input utterance of the support utterance pair data, and optional utterance pair data such as utterance pair data related to a question and utterance pair data related to a counterargument can be used as the expansion source utterance pair data.

The utterance pair acquisition device 10 receives the input data for each of the utterance pair data for expansion, the utterance data for comparison, and the utterance pair data for extraction and performs processing in each processing unit. Each piece of the input data will be described.

The expansion source utterance data is data containing a set of support utterance pairs that are manually collected. A set of optional utterance pairs can be used as the expansion source utterance pair data instead of data that is manually collected.

The utterance data for comparison is data containing a set of utterances utilized to extract keywords characteristic of the expansion source utterance pair data. For the utterance data for comparison, any data can be used as long as the data includes various utterances or sentences. For example, data including a tweet in Twitter (trade name), a sentence in a blog article, and utterances in text chat can be used as the utterance data for comparison.

The utterance pair data for extraction is data that contains a set of utterance pairs for extraction that are utterance pairs as an extraction source for an utterance pair for expansion to be newly acquired. A set of optional utterance pairs can be used as the utterance pair data for extraction, which is a set of the utterance pairs for expansion. As the utterance pair for extraction, for example, a reply pair of Twitter (trade name) or a pair of posts on a web bulletin board can be used. The reply pair is a pair of a specific tweet and a tweet that is a reply to the specific tweet. Further, the pair of posts is a pair of a specific post on a bulletin board and a post that is a reply to the specific post. In the embodiment of the present disclosure, an example in which the reply pair of Twitter (trade name) is used as the utterance pair for extraction will be described.

Hereinafter, each processing unit of the utterance pair acquisition device 10 will be described.

The keyword extraction unit 12 compares the degrees of characteristics of words included in the expansion source utterance pair data and the utterance data for comparison, and, based on a comparison result, extracts a keyword list including a keyword that is a characteristic of the expansion source utterance pair. Specifically, as described below, the keyword extraction unit 12 compares the degrees of characteristics of words included in an input utterance of the expansion source utterance pair data and the utterance data for comparison to extract a keyword list for the input utterance. Further, the keyword extraction unit 12 compares the degrees of characteristics of words included in an output utterance and the utterance data for comparison to extract a keyword list for the output utterance.

FIG. 3 is a diagram illustrating an example of the support utterance pair data as an example of the expansion source utterance pair data. Each row corresponds to a pair, and a first column is an input utterance and a second column is an output utterance. Characteristic words of these utterances are extracted as keywords.

FIG. 4 illustrates an example of the utterance data for comparison. In the example of FIG. 4, utterances in a chat conversation collected by the method described in Reference 2 are collected as the utterance data for comparison.

[Reference 2] Higashinaka, R., Imamura, K., Meguro, T., Miyazaki, C., Kobayashi, N., Sugiyama, H., Hirano, T., Makino, T., Matsuo, Y.: Towards an open domain conversational system fully based on natural language processing. In: Proc. COLING, pp. 928-939 (2014)

In the example of FIG. 4, each line corresponds to one utterance. The keyword extraction unit 12 regards an utterance contained in the utterance data for comparison as a different utterance than an input utterance and an output utterance included in the expansion source utterance pair data, and compares the utterance with the expansion source utterance pair data, so as to list characteristic keywords from the expansion source utterance pair data.

When extracting a keyword, the keyword extraction unit 12 calculates the frequency of occurrence of a word included in each piece of utterance data that is input. The frequency of occurrence is an example of the degree of characteristics. The utterance data includes three pieces of data, which are an input utterance of the expansion source utterance data, an output utterance of the expansion source utterance data, and the utterance data for comparison. To output a keyword list for an input utterance, the keyword extraction unit 12 compares a word of the input utterance of the expansion source utterance data to a word of the utterance data for comparison. To output a keyword list for an output utterance, the keyword extraction unit 12 compares a word of the output utterance of the expansion source utterance data to a word of the utterance data for comparison. The keyword list for each of the input utterance and the output utterance is extracted as described above because the characteristic keywords are different between the input utterance and the output utterance, and are extracted separately for the input utterance and the output utterance. Further, the characteristic keywords are extracted separately for the input utterance and the output utterance because, in processing of the utterance pair extraction unit 14 in the latter stage of extraction, the utterance pair for extraction similar to both an input utterance and an output utterance of the expansion source utterance pair data is to be the extraction target.

Hereinafter, the extraction of the keyword list will be described using a keyword for an input utterance as an example.

In calculation of the frequency of occurrence of a word, an utterance included in each piece of utterance data is morphologically analyzed and put in a format written with a space between words. In this manner, the utterance is morphologically analyzed so that the frequency of occurrence of a word can be counted. Any morphological analyzer may be used, but for example, JTAG of Reference 3 is used.

[Reference 3] Fuchi, T., Takagi, S.: Japanese Morphological Analyzer Using Word Co-occurrence-JTAG-. In: Proc. COLING (1998)

The keyword extraction unit 12 calculates the frequency of occurrence of each word.

Table 1 summarizes the results of calculating the frequency of occurrence of a word included in each piece of utterance data.

TABLE 1

| Utterance Data\Word | Target | Others | Total |
|---|---|---|---|
| Expansion Source Utterance Data (Input Utterance) | A | B | A + B |
| Utterance Data For Comparison | C | D | C + D |
| Total | A + C | B + D | A + B + C + D |

Table 1 is called a contingency table. In each piece of utterance data, the number of times a specific word (target) of interest and other words (others) appear is shown in A to D. A is the number of times a specific word appears as an input utterance of the expansion source utterance data. B is the number of times a word other than a specific word appears as an input utterance. C is the number of times a specific word appears in an utterance of the utterance data for comparison. D is the number of times a word other than a specific word appears in an utterance of the utterance data for comparison.

Using the contingency table, how characteristically each word appears in the expansion source utterance data is calculated by using an $\chi^2$ test. The $\chi^2$ test can be implemented using an optional tool capable of testing. For example, the calculation can be performed using the chi2 contingency function of scipy in Reference 4.

Reference 4 "scipy.org" URL: https://www.scipy.org/

The keyword extraction unit 12 performs the $\chi^2$ test to create a list of words whose frequency of occurrence is significantly higher than an expected value in the expansion source utterance data. The significance level is typically 0.01 or 0.05. Here, the significance level is set to 0.05.

FIG. 5 illustrates an example of a word and a p-value of the word obtained as a result of performing a test for each word. As illustrated in the test result of FIG. 5, a word and a score (p-value) indicating how characteristic the word is in the expansion source utterance data are arranged in each row. The keyword extraction unit 12 extracts a word having a p-value smaller than a value determined by the significance level as a keyword from the test result, and creates a keyword list. The keyword extraction unit 12 creates a keyword list for an input utterance and a keyword list for an input utterance by performing the above test for each of an input utterance of the expansion source utterance data and an output utterance of the expansion source utterance data.

Note that in the embodiment of the present disclosure, a keyword list is created using the $\chi^2$ test. However, a keyword list may be generated using any method as long as the method can obtain the frequency of occurrence of each word. As another method, for example, Fisher's exact test may be used to find a significant difference of each word to create a keyword list.

The utterance pair extraction unit 14 extracts, as an utterance pair for expansion, an utterance pair for extraction that satisfies a predetermined condition regarding the keyword list from among utterance pairs for extraction of the utterance pair data for extraction. As will be described in detail below, in a case where an input utterance and an output utterance included in an utterance pair for extraction satisfy their respective conditions, the utterance pair extraction unit 14 extracts the utterance pair for extraction as an utterance pair for expansion. The predetermined condition of the input utterance is a fact that a ratio of words included in the input utterance that match keywords included in a keyword list for the input utterance becomes equal to or more than a threshold value. The condition of the output utterance is a fact that a ratio of words included in the output utterance that match keywords included in a keyword list for the output utterance becomes equal to or more than a threshold value.

FIG. 6 illustrates an example of a reply pair set of Twitter (trade name) as an example of the utterance pair data for extraction. Each row corresponds to one reply pair, and each pair is separated by space and consists of a first tweet and a second tweet of a reply to the first tweet. The first tweet is considered an input utterance and the second tweet is considered an output utterance. However, since the utterance pair data for extraction contains a lot of noise, it is necessary to extract only an utterance pair for extraction similar to the expansion source utterance pair data by using each of the keyword lists extracted by the keyword extraction unit 12. Hereinafter, an utterance regarded as the input utterance in the utterance pair for extraction is handled as an input utterance of the utterance pair for extraction, and an utterance regarded as the output utterance in the utterance pair for extraction is handled as an output utterance of the utterance pair for extraction.

The utterance pair extraction unit 14 compares a keyword list for the input utterance with the input utterance of the utterance pair for extraction in order to extract the utterance pair for expansion for each of the utterance pairs for extraction included in the utterance pair data for extraction. Further, the utterance pair extraction unit 14 compares a keyword list for the output utterance with the output utterance of the utterance pair data for extraction. Hereinafter, the comparison method will be described using a keyword list for the input utterance as an example.

First, the utterance pair extraction unit 14 performs morphological analysis on each of the utterance pairs for extraction of the utterance pair data for extraction using JTAG in Reference 3 or the like, and converts the utterance pair into a format written with a space between words. Note that the morphological analysis of the utterance pair for extraction may be performed in advance. After that, for each word, whether there is a keyword that matches the keyword list for the input utterance is checked.

For all the words included in the input utterance of the utterance pair for extraction, the utterance pair extraction unit 14 calculates a ratio that matches keywords included in the keyword list for the input utterance. If the ratio of the matching word is equal to or more than a threshold value, the input utterance is determined to be similar to the characteristics of the input utterance included in the expansion source utterance pair data. The threshold value can be set to an optional value, and if the threshold value set to be high, a small number of utterance pairs for expansion can be acquired with high accuracy, and if the threshold value is set to be low, a large number of utterance pairs for expansion can be acquired although the accuracy is lowered. Here, the threshold value is set to 0.5. Note that the number of words may be used as the threshold instead of the ratio of words.

The utterance pair extraction unit 14 similarly performs comparison for the output utterance. For all the words included in the output utterance of the utterance pair for extraction, the utterance pair extraction unit 14 calculates a ratio of words that match keywords included in the keyword list for the output utterance. If the ratio of the matching word is equal to or more than a threshold value, the output utterance is determined to be similar to the characteristics of the output utterance included in the expansion source utterance pair data. In this way, the ratio of words included in the utterance pair for extraction that match the keywords in the keyword list (the keyword list for the input utterance or the keyword list for the output utterance) is used as the condition of determination, and the threshold value of the ratio can be optionally set.

The utterance pair extraction unit 14 performs the above comparison for each of the utterance pairs for extraction and extracts the utterance pair for extraction as the utterance pair for expansion in a case where the comparison results for the input utterance and the output utterance are equal to or more than the threshold value.

Table 2 shows an example in which an utterance pair for expansion is extracted from an utterance pair for extraction.

TABLE 2

| Input Utterance (First Tweet) | | | Output Utterance (Second Tweet) | | | Whether To Extract |
|---|---|---|---|---|---|---|
| Content | Ratio | | Content | Ratio | | |
| Good Morning | 0% | (0/1) | Oha ari! | 33% | (1/3) | Not Extract |
| Why? | 25% | (1/4) | Receive | 100% | (2/2) | Not Extract |
| Raw Vegetable | 50% | (1/2) | Boil It Deliciously | 66% | (2/3) | Extract |
| Spinach Is Rich In Zinc | 60% | (3/5) | It Is Also Rich In Vitamins | 100% | (4/4) | Extract |
| Instagram Is Also Interesting | 75% | (3/4) | Instagram Looks Interesting | 66% | (2/3) | Extract |

Table 2 is an example of a case in which an utterance pair for expansion is extracted from an utterance pair for extraction (a reply pair of Twitter). The underline shows that the word is included in the keyword list.

As shown in Table 2, the extracted utterance pairs for extraction include words such as "zinc" and "Instagram" that are not included in the expansion source utterance pair, and it can be seen that the variety of input utterances is widened.

FIG. 7 is a diagram illustrating an example of utterance pair data for expansion including an utterance pair for expansion output by the utterance pair extraction unit 14. As the utterance pair for expansion, only an utterance pair similar to the expansion source utterance pair data is extracted. This is because the utterance pair for expansion contains a characteristic key word included in the expansion source utterance pair data. That is, the input utterance of the utterance pair for expansion has a characteristic similar to that of the input utterance included in the expansion source utterance pair data. Further, the output utterance of the utterance pair for expansion has a characteristic similar to that of the output utterance included in the expansion source utterance pair data. For this reason, by using the utterance pair data for expansion together with the expansion source utterance pair data for training of the utterance generation model, training of the utterance generation model that can support more various inputs.

Figure 8:
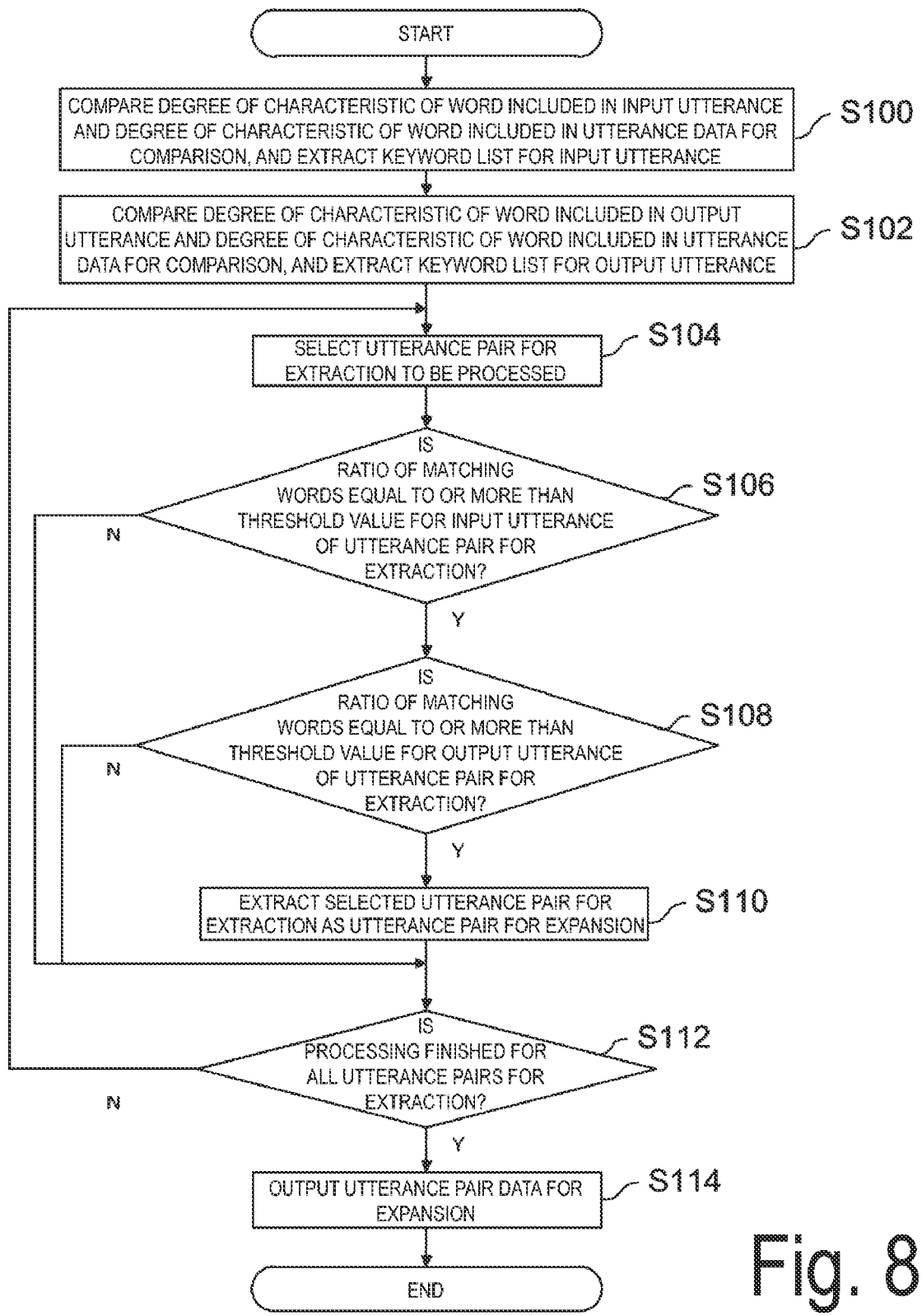
FIG. 8 is a flowchart illustrating a processing routine in the utterance pair acquisition device according to the embodiment of the present disclosure.

Action of Utterance Pair Acquisition Device According to Embodiments of Present Disclosure Next, an action of the utterance pair acquisition device 10 according to the embodiment of the present disclosure will be described. FIG. 8 is an example of a flowchart illustrating a processing routine of the utterance pair acquisition device 10.

In Step S100, the keyword extraction unit 12 compares the degrees of characteristics of words included in an input utterance of the expansion source utterance pair data and the utterance data for comparison to extract a key word list for the input utterance. Specifically, it is only required that the comparison of the degrees of characteristics of words is performed in a manner that, as described above, the ratio of appearance of a word is calculated and comparison is performed by the $\chi^2$ test.

In Step S102, the keyword extraction unit 12 compares the degrees of characteristics of words included in an output utterance of the expansion source utterance pair data and the utterance data for comparison to extract a keyword list for the output utterance.

In Step S104, the utterance pair extraction unit 14 selects an utterance pair for extraction to be processed from the utterance pair data for extraction.

In Step S106, for the input utterance of the selected utterance pair for extraction, the utterance pair extraction unit 14 determines whether a ratio of words that match keywords included in the keyword list for the input utterance is equal to or more than the threshold value.

If the ratio is equal to or more than the threshold value, the processing proceeds to Step S108, and if the ratio is less than the threshold value, the processing proceeds to Step S112.

In Step S108, for the output utterance of the selected utterance pair for extraction, the utterance pair extraction unit 14 determines whether a ratio of words that match keywords included in the keyword list for the output utterance is equal to or more than the threshold value.

If the ratio is equal to or more than the threshold value, the processing proceeds to Step S110, and if the ratio is less than the threshold value, the processing proceeds to Step S112.

In Step S110, the utterance pair extraction unit 14 extracts the selected utterance pair for extraction as an utterance pair for expansion.

In Step S112, the utterance pair extraction unit 14 determines whether the processing has been completed for all the utterance pairs for extraction, and if so, the processing proceeds to step S114, and if not, the processing returns to Step S104, and a next utterance pair for extraction is selected and the processing is repeated.

In Step S114, the utterance pair extraction unit 14 outputs the utterance pair data for expansion including the extracted utterance pair for expansion, and the processing ends.

As described above, according to the utterance pair acquisition device according to the embodiment of the present disclosure, it is possible to acquire an utterance pair for expansion necessary for outputting an appropriate output utterance for an input utterance.

By extracting training data from a large amount of text data, it is possible to widen the variety of input utterances of data that can be used for training. In this manner, it becomes possible to generate appropriate output utterances for more input utterances than input utterances included in training data collected manually, and the quality of the utterance generation model is improved.

Note that the present disclosure is not limited to the above-described embodiment, and various modifications and applications may be made without departing from the gist of the present disclosure.

For example, in the above-described embodiment, the case where a keyword list for an input utterance and a keyword list for an output utterance are used for comparison to extract an utterance pair for expansion is described as an example. However, the present disclosure is not limited to this. For example, the configuration may be such that the keyword extraction unit 12 extracts only a keyword list for an output utterance, and the utterance pair extraction unit 14 compares only an output utterance of an utterance pair for expansion with the keyword list for the output utterance to extract an utterance pair for expansion. This is because, in a case where a wide variety of output utterances is desirably acquired as training data used for training of the utterance generation model, it is only required to obtain at least an utterance pair for expansion in which characteristics of output utterances are similar.

Further, for example, the threshold value of an input utterance and the threshold value of an output utterance in the utterance pair extraction unit 14 may be made different. For example, the threshold value of an input utterance is set to be relatively low and the threshold value of an output utterance is set to be high. In this manner, it is possible to extract an utterance pair for expansion by narrowing down to utterance pairs with greater similarity of characteristics of the output utterance while ensuring the similarity of the characteristics of the input utterance to some extent.

REFERENCE SIGNS LIST

10 Utterance pair acquisition device
12 Keyword extraction unit
14 Utterance pair extraction unit

The invention claimed is:

1. An utterance pair acquisition device comprising a processor configured to execute operations comprising:
   determining a first degree of characteristic of a first word and a second degree of characteristic of a second word,
      wherein the first word is a part of an output utterance of expansion source utterance pair data, the expansion source utterance pair data represents a set of expansion source utterance pairs including an input utterance and the output utterance for the input utterance as learning data for training an utterance generation model,
      the second word is a part utterance data of a set of utterances for comparison, and
      the set of expansion source utterance pairs is distinct from the set of utterances for comparison;
   generating output utterances of the set of expansion source utterance pairs in a format with a space between words of the output utterance for extracting one or more words from the output utterances as keywords by morphologically analyzing the output utterance;
   generating, based on the first degree of characteristic of the first word and the second degree of characteristic of the second word, a keyword list for output utterances, and the keyword list for output utterances includes a keyword representing a characteristic of the output utterance of the expansion source utterance pair;
   extracting, based on the stored keyword list for output utterances and a set of utterance pair data for extraction, an utterance pair for extraction, wherein the set of utterance pair data for extraction is distinct from the set of utterances for comparison, the set of utterance pair data for extraction includes an utterance pair data for extraction, and the utterance pair data for extraction satisfies a predetermined condition according to the keyword list as an utterance pair as an addition to the set of expansion source utterance pairs; and
   transmitting the extracted utterance pair for extraction to an application including an utterance generation model configured to train the utterance generation model by using the extracted utterance pair for extraction as additional learning data.

2. The utterance pair acquisition device according to claim 1, wherein
   the determining further comprises:
      comparing a degree of characteristic of a word included in the input utterance of the expansion source utterance pair data and a degree of characteristic of a word included in the utterance data for comparison to extract the keyword list for input utterances, and
      comparing a degree of characteristic of a word included in the output utterance and the degree of characteristic of a word included in the utterance data for comparison to extract a keyword list for output utterances, and
   the extracting an utterance pair for extraction further comprises, in a case where the input utterance included in the utterance pair for extraction satisfies a predetermined condition regarding the keyword list for the input utterance, and an output utterance for the input utterance satisfies a predetermined condition regarding the keyword list for the output utterance, the utterance pair for extraction as the utterance pair for expansion.

3. The utterance pair acquisition device according to claim 2, wherein
   the predetermined condition represents a ratio of a word included in the utterance pair for extraction that matches a keyword in the keyword list and is a ratio that is optionally settable.

4. The utterance pair acquisition device according to claim 1, wherein
   the predetermined condition represents a ratio of a word included in the utterance pair for extraction that matches a keyword in the keyword list.

5. An utterance pair acquisition method comprising:
   determining a first degree of characteristic of a first word and a second degree of characteristic of a second word,
      wherein the first word is a part of an output utterance of expansion source utterance pair data, the expansion source utterance pair data represents a set of expansion source utterance pairs including an input utterance and the output utterance for the input utterance as learning data for training an utterance generation model,
      the second word is a part of utterance data of a set of utterances for comparison;
   generating, based on result the first degree of characteristic of the first word and the second degree of characteristic of the second word, a keyword list for output utterances, and the keyword list of output utterances includes a keyword representing a characteristic of the output utterance of the expansion source utterance pair;
   extracting, based on the stored keyword list for output utterances and a set of utterance pair data for extraction, an utterance pair for extraction, wherein the set of utterance pair data for extraction is distinct from the set of utterances for comparison, the set of utterance pair data for extraction includes an utterance pair data for extraction, and the utterance pair data for extraction satisfies a predetermined condition according to the keyword list for output utterances as an utterance pair as an addition to the expansion source utterance pairs; and
   transmitting the extracted utterance pair for extraction to an application including an utterance generation model configured to train the utterance generation model by using the extracted utterance pair for extraction as additional learning data.

6. The utterance pair acquisition method according to claim 5,
   wherein the determining the first degree of characteristic of the first word and the second degree of characteristic of the second word further comprises:
      comparing a degree of characteristic of a word included in the input utterance of the expansion source utterance pair data and a degree of characteristic of a word included in the utterance data for comparison to extract a keyword list for the input utterance, and comparing a degree of characteristic of a word included in the output utterance and a degree of characteristic of a word included in the utterance data for comparison to extract a keyword list for the output utterance, and wherein the extracting an utterance pair for extraction further comprises extracting, in a case where the input utterance included in the utterance pair for extraction satisfies a predetermined condition regarding the keyword list for the input utterance, and an output utterance for the input utterance satisfies a predetermined condition regarding the keyword list for the output utterance, the utterance pair for extraction as the utterance pair for expansion.

7. The utterance pair acquisition method according to claim 6, wherein the predetermined condition represents a ratio of a word included in the utterance pair for extraction that matches a keyword in the keyword list.

8. The utterance pair acquisition method according to claim 5, wherein the predetermined condition represents a ratio of a word included in the utterance pair for extraction that matches a keyword in the keyword list.

9. A computer-readable non-transitory recording medium storing computer-executable program instruction that when executed by a processor cause a computer system to:

determine a first degree of characteristic of a first word and a second degree of characteristic of a second word, wherein the first word is a part of an output utterance of expansion source utterance pair data, the expansion source utterance pair data represents a set of expansion source utterance pairs including an input utterance and the output utterance for the input utterance as learning data for training an utterance generation model, the second word is a part utterance data of a set of utterances for comparison, and the set of expansion source utterance pairs is distinct from the set of utterances for comparison;

generate, based on the first degree of characteristic of the first word and the second degree of characteristic of the second word, a keyword list for output utterances, and the keyword list for output utterances includes a keyword representing a characteristic of the output utterance of expansion source utterance pair;

extract, based on the stored keyword list for output utterances and a set of utterance pair data for extraction, an utterance pair for extraction, wherein the set of utterance pair data for extraction is distinct from the set of utterances for comparison, the set of utterance pair data for extraction includes an utterance pair data for extraction, and the utterance pair data for extraction satisfies a predetermined condition according to the keyword list as an utterance pair as an addition to the set of expansion source utterance pairs; and transmit the extracted utterance pair for extraction to an application including an utterance generation model configured to train the utterance generation model by using the extracted utterance pair for extraction as additional learning data.

10. The computer-readable non-transitory recording medium according to claim 9, wherein the determining further comprises comparing a degree of characteristic of a word included in the input utterance of the expansion source utterance pair data and a degree of characteristic of a word included in the utterance data for comparison to extract a keyword list for the input utterance, and comparing a degree of characteristic of a word included in the output utterance and a degree of characteristic of a word included in the utterance data for comparison to extract a keyword list for the output utterance, and wherein the extracting an utterance pair for extraction for further comprises, in a case where the input utterance included in the utterance pair for extraction satisfies a predetermined condition regarding the keyword list for the input utterance, and an output utterance for the input utterance satisfies a predetermined condition regarding the keyword list for the output utterance, the utterance pair for extraction as the utterance pair for expansion.

11. The computer-readable non-transitory recording medium according to claim 10, wherein the predetermined condition represents a ratio of a word included in the utterance pair for extraction that matches a keyword in the keyword list.

12. The computer-readable non-transitory recording medium according to claim 9, wherein the predetermined condition represents a ratio of a word included in the utterance pair for extraction that matches a keyword in the keyword list.

* * * * *